(12) United States Patent
Tochikubo et al.

(10) Patent No.: US 7,079,655 B1
(45) Date of Patent: Jul. 18, 2006

(54) ENCRYPTION ALGORITHM MANAGEMENT SYSTEM

(75) Inventors: Kouya Tochikubo, Tokyo (JP); Koji Okada, Tokyo (JP); Naoki Endo, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 820 days.

(21) Appl. No.: 09/679,541

(22) Filed: Oct. 6, 2000

(30) Foreign Application Priority Data

Oct. 25, 1999 (JP) .................................. 11-301842

(51) Int. Cl.
- H04L 9/00 (2006.01)
- H04L 9/32 (2006.01)
- H04K 1/00 (2006.01)
- G06F 11/30 (2006.01)
- G06F 12/14 (2006.01)
- G06Q 99/00 (2006.01)

(52) U.S. Cl. ...................... 380/281; 380/273; 713/159; 713/172; 713/193; 705/51; 705/52; 726/26; 726/27

(58) Field of Classification Search ................. 713/193, 713/179, 159; 380/281, 273, 260
See application file for complete search history.

(56) References Cited

U.S. PATENT DOCUMENTS

| | | | |
|---|---|---|---|
| 4,484,025 A | * | 11/1984 | Ostermann et al. ......... 380/279 |
| 5,029,207 A | | 7/1991 | Gammie |
| 5,081,679 A | * | 1/1992 | Dent ........................... 380/272 |
| 5,751,805 A | * | 5/1998 | Otsuki et al. .................. 705/54 |
| 5,832,092 A | | 11/1998 | Okuda et al. |

FOREIGN PATENT DOCUMENTS

| | | |
|---|---|---|
| WO | WO 95/34968 | 12/1995 |
| WO | WO 95/34969 | 12/1995 |

* cited by examiner

*Primary Examiner*—Gilberto Barrón
*Assistant Examiner*—Benjamin E. Lanier
(74) *Attorney, Agent, or Firm*—Oblon, Spivak, McClelland, Maier & Neustadt, P.C.

(57) ABSTRACT

An encryption algorithm management system has a terminal unit and a center unit that have a common cipher-key to a ciphered encryption algorithm. The terminal unit includes a transmitter configured to transmit a demand to the center unit for obtaining an encrypted data needed for decrypting the ciphered encryption algorithm when the ciphered encryption algorithm is decrypted, and an encryption controller configured to renew the common cipher-key in case of receiving the encrypted data from the center unit in response to the demand, and to produce an encryption algorithm by decrypting the encrypted data with the renewed common cipher-key. The center unit includes a key controller configured to renew the common cipher-key so as to be identical with the renewed common cipher-key in case of receiving the demand from the transmitter and an encoder configured to produce the encrypted data by encrypting a cipher-key with the renewed common cipher-key and to transmit the encrypted data to the terminal unit.

24 Claims, 6 Drawing Sheets

ENCRYPTION ALGORITHM MANAGEMENT SYSTEM

CROSS REFERENCE TO RELATED APPLICATION

This application claims benefit of priority to Japanese Patent Application No. 11-301842 filed Oct. 25, 1999, the entire content of which is incorporated by reference herein.

BACKGROUND OF THE INVENTION

1. Field of the Invention

This invention relates to an encryption algorithm management system that supervises encryption algorithms used in a data encryption system and may prevent the encryption algorithms from utilized carelessly and dishonestly.

2. Discription of the Background

Currently, the data encryption system, which utilizes encryption systems using the encryption algorithm and cipher-keys, is widely used in various computers that are connected to a network. In this kind of data encryption system, there are various encryption algorithms, which are used in different ways depending on the respective purposes.

Such encryption algorithms may be regulated to export in the United State etc. depending on how long and sophisticated the encryption algorithm is. However, these kinds of encryption algorithms are carelessly or dishonestly used by unauthorized users due to development of an open network.

As described above, in the data encryption system, the encryption algorithm has been carelessly or dishonestly used due to the development of an open network.

SUMMARY OF THE INVENTION

Accordingly, one object of this invention is to provide an encryption algorithm management system that may prevent an encryption algorithm from utilized carelessly or dishonestly by supervising the encryption algorithm used for a data encryption system.

The present invention provides an encryption algorithm management system having a terminal unit and a center unit that have a common cipher-key to a ciphered encryption algorithm, the terminal unit includes a transmitter configured to transmit a demand to the center unit for obtaining an encrypted data needed for decrypting the ciphered encryption algorithm when the ciphered encryption algorithm is decrypted, and an encryption controller configured to renew the common cipher-key in case of receiving the encrypted data from the center unit in response to the demand, and to produce an encryption algorithm by decrypting the encrypted data with the renewed common cipher-key, the center unit includes a key controller configured to renew the common cipher-key so as to be identical with the renewed common cipher-key in case of receiving the demand from the transmitter and an encoder configured to produce the encrypted data by encrypting a cipher-key with the renewed common cipher-key and to transmit the encrypted data to the terminal unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Several embodiments of the present invention are hereinafter described referring to drawings.

In the embodiments, symbols "E(X)[Y]" or "E(Z,X)[Y]" represent encrypted data that a data "Y" is encrypted with a cipher-key "X" by using encryption algorithm "Z".

Figure 1:
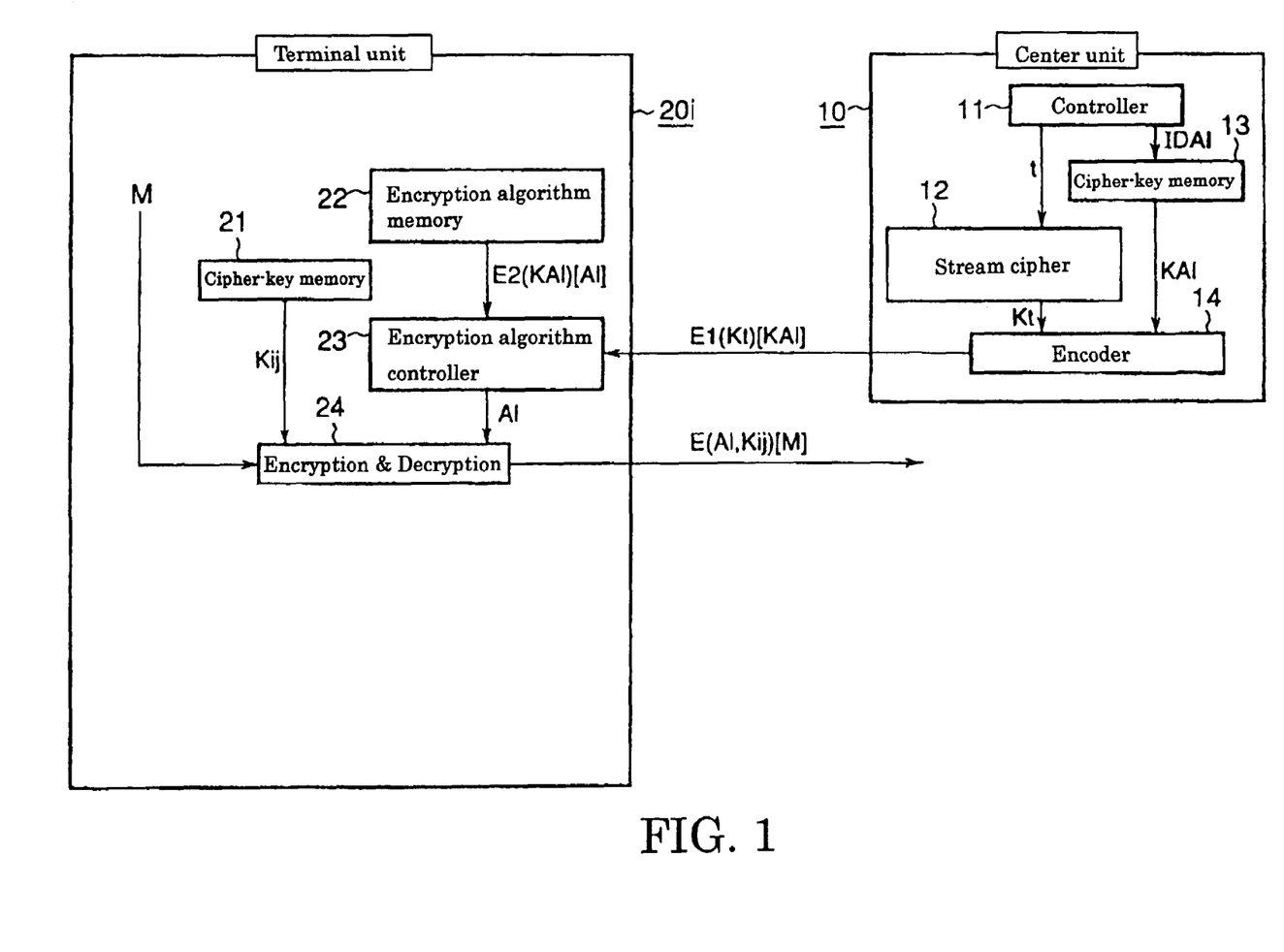
FIG. 1 is a block diagram showing an encryption algorithm management system of a first embodiment of the present invention.

FIG. 1 is a block diagram showing an encryption algorithm management system of a first embodiment of the present invention. The encryption algorithm management system includes a center unit 10 and pluralities of terminal units 20$i$ (i=1~n) connected to the center unit 10 via communication networks.

The center unit 10 includes a controller 11, a stream cipher such as a linear feedback shift resister 12, a cipher-key information memory 13 and an encoder 14.

The controller 11 verifies whether the terminal unit 20$i$ is authorized to use an encryption algorithm on the basis of administrative information such as an expiration date or the like in case of receiving a demand from the terminal unit 20$i$. If the terminal unit 20$i$ has the authorization, the controller 11 inputs a state value of "t", which is stored in a stream cipher 26 in the terminal unit 20$i$, into the stream cipher 12, and inputs an identification index "IDAl" into the cipher-key information memory 13.

The stream cipher 12 produces an output value "Kt" corresponding to the state value "t" from the controller 11 and inputs the output value "Kt" into the encoder 14.

The cipher-key information memory 13 memorizes cipher-keys "KAl" corresponding to the respective identification indexes IDAl and has a function of inputting the cipher-key "KAl" corresponding to the identification index IDAl outputted from the controller 11 into the encoder 14.

The encoder 14 has functions of encrypting the cipher-key "KAl" from the cipher-key information memory 13 by using the output value "Kt" of the stream cipher 12, and transmitting the encrypted data E1(Kt)[KAl], that is the encrypted cipher-key, to the terminal unit 20$i$.

The terminal unit 20$i$, which may be composed of a computer such as a personal computer, includes and controls a cipher-key information memory 21, an encryption algorithm memory 22, an encryption algorithm controller 23 and an encrypting and decrypting controller 24.

The cipher-key information memory 21 memorizes communication cipher-keys "Kij" needed for communicating with other terminal unit 20$j$ (not shown). The terminal unit 20$i$ controls the cipher-key information memory 21 to transmit the cipher-key "Kij" to the encrypting and decrypting controller 24.

The encryption algorithm memory 22 memorizes encrypted data E2(KAl)[Al], that is the ciphered encryption algorithm. The terminal unit 20i controls the encryption algorithm memory 22 to transmit the encrypted data E2(KAl)[Al] to the encryption algorithm controller 23.

The encryption algorithm controller 23 has functions of decrypting the encrypted data E1(Kt)[KAl] from the center unit 10 and then decrypting the encrypted data E2(KAl)[Al] from the encryption algorithm memory 22 on the basis of the decryption result of the encrypted data E1(Kt)[KAl], that is "KAl" or "ERROR". The encryption algorithm controller 23 finally inputs the decryption result of the encrypted data E2(KAl)[Al], that is "Al" or "ERROR", into the encrypting and decrypting controller 24.

Figure 2:
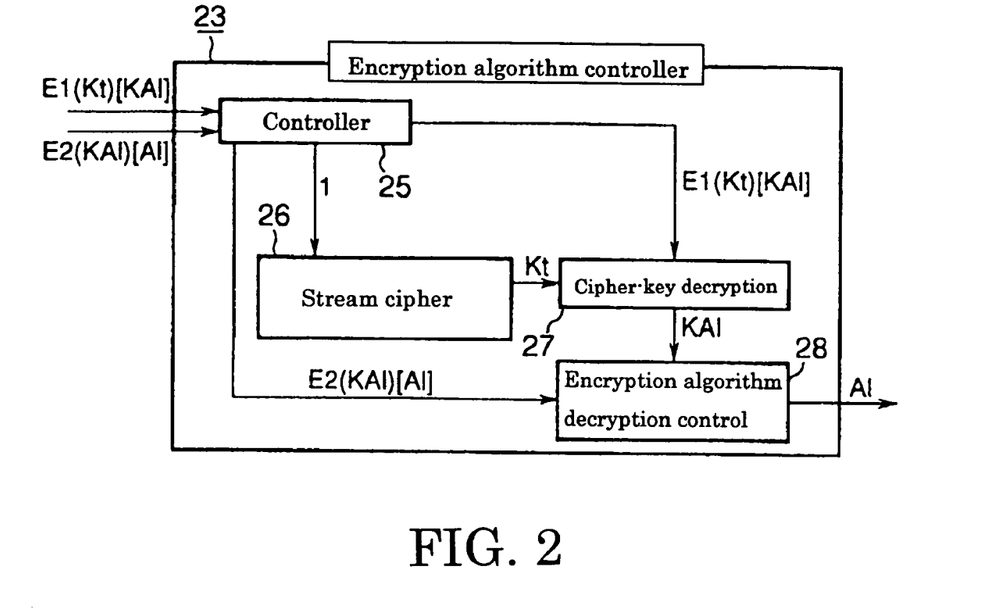
FIG. 2 is a block diagram showing components of an encryption algorithm controller of the first embodiment.

As shown in FIG. 2, the encryption algorithm controller 23, which is stored in unreadable memory area that may not be rewritten by outsiders such as users, includes a controller 25, the stream cipher 26, a cipher-key decryption controller 27 and an encryption algorithm decryption controller 28.

The controller 25 has functions of inputting both the encrypted data E1(Kt)[KAl] into the cipher-key decryption controller 27 and the encrypted data E2(KAl)[Al] into the encryption algorithm decryption controller 28, and further inputting a creation signal "1" needed for creating the next state value into the stream cipher 26 in case of receiving both the encrypted data E1(Kt)[KAl] from the center unit 10 and the encrypted data E2(KAl)[Al] from the encryption algorithm memory 22.

The stream cipher 26 produces the output value "Kt" on the basis of the current state value "t" and memorizes a new state value "t+1" in case of receiving the creation signal "1" from the controller 25. The stream cipher 26 then inputs the out put value "Kt" into the cipher-key decryption controller 27.

The cipher-key decryption controller 27 decrypts the encrypted data E1(Kt)[KAl] by using the output value "Kt" as a common cipher-key, and inputs the decryption result of the encrypted data E1(Kt)[KAl], that is "KAl", into the encryption algorithm decryption controller 28.

The encryption algorithm decryption controller 28 decrypts the encrypted data E2(KAl)[Al] by using the decryption result "KAl" as a cipher-key, and inputs the decryption result of the encrypted data E2(KAl)[Al], that is an encryption algorithm "Al", into the encrypting and decrypting controller 24.

The encrypting and decrypting controller 24 encrypts a message "M", which is inputted by the terminal unit 20i itself, by using the encryption algorithm "Al" from the encryption algorithm decryption controller 28 and the communication cipher-key Kij from the cipher-key information memory 21, and transmits the encrypted data E(Al, Kij) [M] to the other terminal unit 20j.

An operation of the above-mentioned encryption algorithm management system is hereinafter described.

In the center unit 10, the controller 11 verifies whether the terminal unit 20i is authorized to use encryption algorithm on the basis of an expiration date or the like in case of receiving a demand from the terminal unit 20i. If the terminal unit 20i has the authorization, the controller 11 inputs a state value of "t" of a stream cipher 26 in the terminal unit 20i into the stream cipher 12, and inputs an identification index of IDAl into the cipher-key information memory 13.

The stream cipher 12 produces an output value "Kt" corresponding to the state value "t" from the controller 11 and inputs the output value "Kt" to the encoder 14.

The cipher-key information memory 13 inputs the cipher-key "KAl" corresponding to the identification index IDAl outputted from the controller 11 into the encoder 14.

The encoder 14 encrypts the cipher-key "KAl" from the cipher-key information memory 13 by using the output value "Kt" of the stream cipher 12, and transmits the encrypted data E1(Kt)[KAl], that is the encrypted cipher-key, to the terminal unit 20i.

The terminal unit 20i controls the cipher-key information memory 21 to transmit the cipher-key "Kij" to the encrypting and decrypting controller 24 in response to the encrypted data E1(Kt)[KAl].

The terminal unit 20i controls the encryption algorithm memory 22 to transmit the encrypted data E2(KAl)[Al] to the encryption algorithm controller 23.

In the encryption algorithm controller 23, the controller 25 inputs both the encrypted data E1(Kt)[KAl] into the cipher-key decryption controller 27 and the encrypted data E2(KAl)[Al] into the encryption algorithm decryption controller 28, and further inputs a creation signal "1" needed for creating the next state value into the stream cipher 26 in case of receiving both the encrypted data E1(Kt)[KAl] from the center unit 10 and the encrypted data E2(KAl)[Al] from the encryption algorithm memory 22.

The stream cipher 26 produces the output value "Kt" on the basis of the current state value "t" and memorizes a new state value "t+1" in case of receiving the creation signal "1" from the controller 25. The stream cipher 26 then inputs the output value "Kt" into the cipher-key decryption controller 27.

The cipher-key decryption controller 27 decrypts the encrypted data E1(Kt)[KAl] by using the output value "Kt" as a common cipher-key, and inputs the decryption result of the encrypted data E1(Kt)[KAl], that is "KAl", into the encryption algorithm decryption controller 28.

The encryption algorithm decryption controller 28 decrypts the encrypted data E2(KAl)[Al] by using the decryption result "KAl" as a cipher-key, and inputs the decryption result of the encrypted data E2(KAl)[Al], that is an encryption algorithm "Al", into the encrypting and decrypting controller 24.

The encrypting and decrypting controller 24 encrypts a message "M", which is inputted by the terminal unit 20i itself, by using the encryption algorithm "Al" from the encryption algorithm decryption controller 28 and the communication cipher-key "Kij" from the cipher-key information memory 21, and transmits the encrypted data E(Al, Kij)[M] to the other terminal unit 20j.

According to the first embodiment, since a common cipher-key, that is the output value of the stream cipher, is renewed every time that the terminal unit 20i uses encryption algorithm "Al", the terminal unit 20i needs to obtain an encrypted data, which is encrypted with the common cipher-key, from the center unit 10. Accordingly, the encryption algorithm may be managed so as not to be utilized carelessly or dishonestly. Further, since the encryption algorithm controller 23 is stored in unreadable memory area that may not be rewritten by user, the encryption algorithm management system may prevent dishonest use of the encryption algorithm that is executed by means of backup of the memory area of the terminal unit 20i.

Furthermore, since the encryption algorithm controller 23 is stored in unreadable memory area that may not be rewritten by user, an unauthorized person may not tamper with the encryption algorithm controller 23.

Moreover, since the controller 11 verifies whether the terminal unit 20i is authorized to use encryption algorithm in case of receiving a demand from the terminal unit 20*i* and inputs a state value of "t" into the stream cipher 12 in order to obtain a common cipher-key "Kt" only if the terminal unit 20*i* has the authorization, the encryption algorithm may be managed on the basis of the authorization for the terminal unit 20*i*.

The effect of the tamper-resistance on the encryption algorithm controller 23 and the effect of the verification of authorization on the controller 11 may be achieved in the following embodiments in the same way as the first embodiment, although the operation and name of the encryption algorithm controller 23 change.

Second Embodiment

Figure 3:
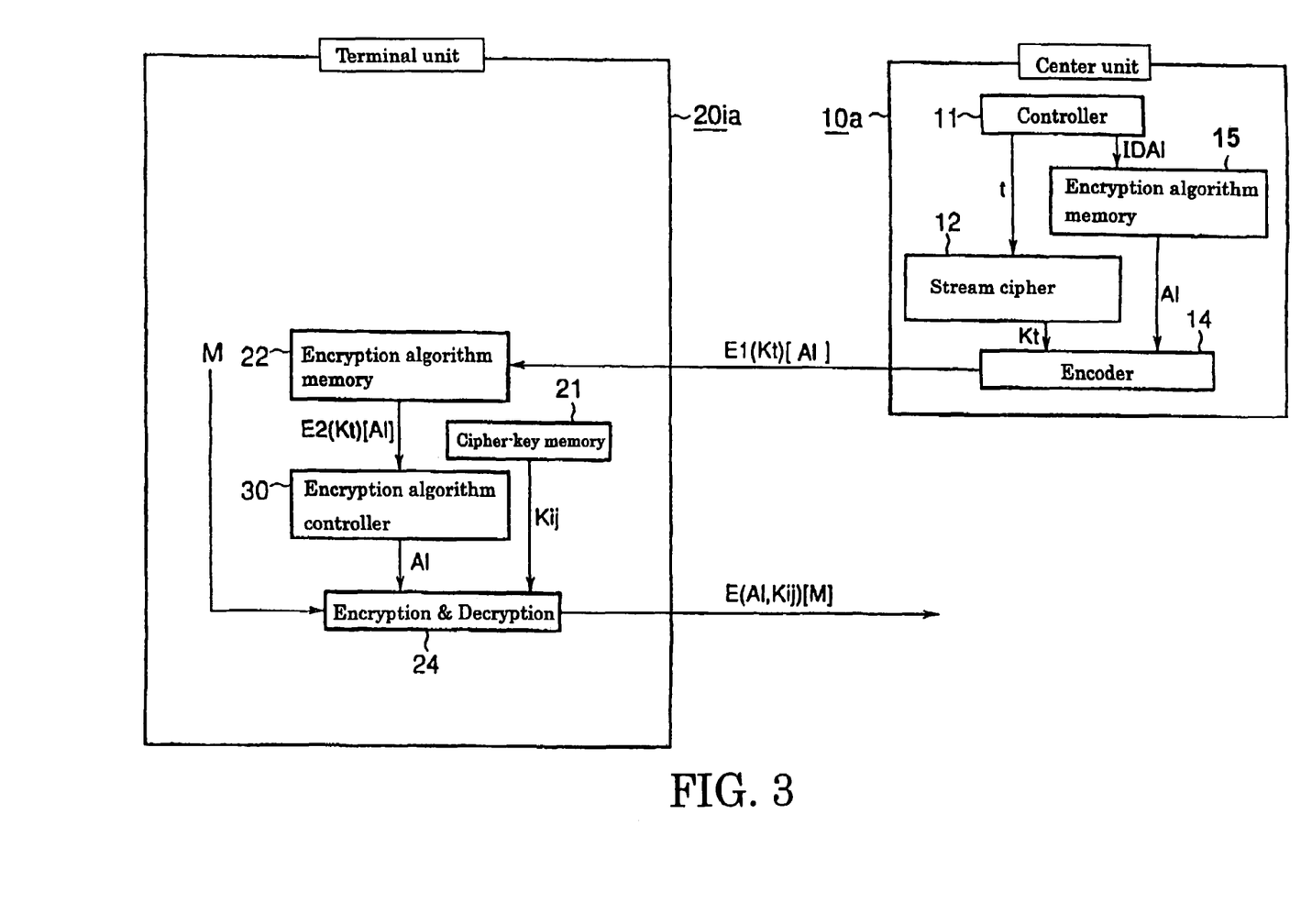
FIG. 3 is a block diagram showing an encryption algorithm management system of a second embodiment of the present invention.
Figure 4:
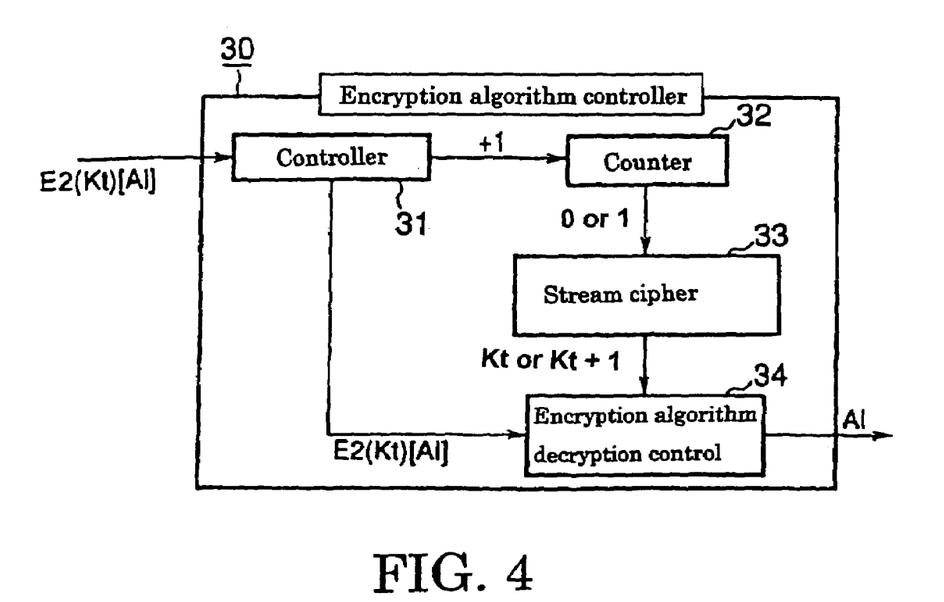
FIG. 4 is a block diagram showing components of an encryption algorithm controller of the second embodiment.

FIG. 3 is a block diagram showing an encryption algorithm management system of a second embodiment of the present invention. FIG. 4 is a block diagram showing components of an encryption algorithm controller 30. A detail explanation of the same components as the components shown in FIGS. 1 and 2 are omitted by means of giving the same numerals as the components of the first embodiment to the same components. The only different components from the components shown in FIGS. 1 and 2 are mainly described herein.

The encryption algorithm management system of the second embodiment is a modified system of the first embodiment. In the second embodiment, a center unit transmits an encrypted data of encryption algorithm, that is ciphered encryption algorithm, instead of the encrypted data of the cipher-key. Further, a terminal unit transmits a demand to the center unit at every "n"times that the encryption algorithm is used, instead of transmitting the demand every time.

Concretely speaking, the center unit 10*a* has an encryption algorithm memory 15 instead of the cipher-key information memory 13.

The terminal unit 20*ia* has a function of storing an encrypted data E2(Kt)[Al] including encryption algorithm "Al", which is transmitted from the center unit 10*a*, into the encryption algorithm memory 22. Further, as shown in FIG. 4, the terminal unit 20*ia* has the encryption algorithm controller 30 that includes a counter 32 instead of the encryption algorithm controller 23 shown in FIG. 2.

The encryption algorithm memory 15 memorizes encryption algorithm "Al" corresponding to the respective identification indexes IDAl and has a function of inputting the encryption algorithm "Al" corresponding to the identification index IDAl inputted by the controller 11 into the encoder 14.

The encoder 14 has functions of encrypting the encryption algorithm "Al" from the encryption algorithm memory 15 by using the output value "Kt" of the stream cipher 12, and transmitting the encrypted data E2(Kt)[Al], that is the ciphered encryption algorithm, to the terminal unit 20*ia*.

The encryption algorithm controller 30 has a function of counting the number of transmission of the encrypted data E2(Kt)[Al] from the encryption algorithm memory 22. Further, the encryption algorithm controller 30 has a function of inputting the encryption algorithm "Al", that is the decryption result of the encrypted data E2(Kt)[Al], into the encrypting and decrypting controller 24 if the number of the transmission is less than "n" times, but inputting a random data, which is the decryption result in failure, into the encrypting and decrypting controller 24 if the number of the transmission is "n" times or over.

Concretely speaking, the encryption algorithm controller 30, which is stored in unreadable memory area that may not be rewritten by outsiders such as users, includes a controller 31, the counter 32, a stream cipher 33 and an encryption algorithm decryption controller 34.

The controller 31 has a function of inputting the encrypted data E2(Kt)[Al] into the encryption algorithm decryption controller 34 and a count signal "1" into the counter 32 in case of receiving the encrypted data E2(Kt)[Al] from the encryption algorithm memory 22.

The counter 32 memorizes the number of the count signals and has a function of increasing the number of the count signals by one in case of receiving the count signal "1" from the controller 31. Further, the counter 32 has functions of inputting a signal "0" into the stream cipher 33 if the renewed number of the count signals is less than an upper limit, which corresponds to the "n" times, of a permission to use the encryption algorithm, and inputting a signal "1" into the stream cipher 33 if the renewed number of the count signals is the upper limit or over.

The stream cipher 33 stores a new state value "t+1" and has functions of inputting the "Kt+1" corresponding to the state value "t+1" into the encryption algorithm decryption controller 34 in case of receiving the signal "1" from the counter 32, and inputting a value "Kt" that originates from the state value "t" into the encryption algorithm decryption controller 34 in case of receiving the signal "0" from the counter 32.

The encryption algorithm decryption controller 34 has a function of decrypting the encrypted data E2(Kt)[Al] by using the output value "Kt" from the stream cipher 33 as a cipher-key, and inputting the decryption result of the encrypted data E2(Kt)[Al], that is an encryption algorithm "Al", into the encrypting and decrypting controller 24. Further, the encryption algorithm decryption controller 34 has a function of inputting the decryption result in failure into the encrypting and decrypting controller 24 when the cipher-key is wrong.

An operation of the above-mentioned encryption algorithm management system is hereinafter described.

In the center unit 10*a*, the encryption algorithm memory 15 inputs the encryption algorithm "Al" corresponding to the identification index IDAl inputted by the controller 11 into the encoder 14 in case of receiving a demand from the terminal unit 20*ia*. The demand is transmitted every "n" times that encryption algorithm is used in the terminal unit 20*ia*.

The encoder 14 encrypts the encryption algorithm "Al" from the encryption algorithm memory 15 by using the output value "Kt" of the stream cipher 12, and transmits the encrypted data E2(Kt)[Al], that is the ciphered encryption algorithm, to the terminal unit 20*ia*.

The terminal unit 20*ia* stores the encrypted data E2(Kt)[Al] into the encryption algorithm memory 22, and controls the encryption algorithm memory 22 to transmit the encrypted data E2(Kt)[Al] to the encryption algorithm controller 30 every time that an encryption algorithm is used.

In the encryption algorithm controller 30, the controller 31 inputs the encrypted data E2(Kt)[Al] into the encryption algorithm decryption controller 34 and a count signal "1" into the counter 32 in case of receiving the encrypted data E2(Kt)[Al]from the encryption algorithm memory 22.

The counter 32 renews the number of the count signals so as to increase by one in case of receiving the count signal "1" from the controller 31. Further, the counter 32 inputs a signal "0" into the stream cipher 33 if the renewed number of the count signals is less than an upper limit, which corresponds to the "n" times, of a permission to use the encryption algorithm, and inputs a signal "1" into the stream cipher 33 if the renewed number of the count signals is the upper limit or over.

The stream cipher 33 inputs a value "Kt" corrensonding to the current state value "t" into the encryption algorithm decryption controller 34 in case of receiving the signal "0" from the counter 32, and inputting the value "Kt+1" that originates from the new state value "t+1" into the encryption algorithm decryption controller 34 in case of receiving the signal "1" from the counter 32.

The encryption algorithm decryption controller 34 decrypts the encrypted data E2(Kt)[Al] by using the output value "Kt" from the stream cipher 33 as a cipher-key, and inputs the decryption result of the encrypted data E2(Kt)[Al], that is an encryption algorithm "Al", into the encrypting and decrypting controller 24.

The encrypting and decrypting controller 24 encrypts a message "M", which is inputted by the terminal unit 20ia itself, by using the encryption algorithm "Al" from the encryption algorithm decryption controller 34 and the communication cipher-key "Kij" from the cipher-key information memory 21, and transmits the encrypted data E(Al, Kij)[M] to the other terminal unit 20j.

Further, the encryption algorithm decryption controller 34 inputs the decryption result in failure into the encrypting and decrypting controller 24 when the cipher-key is wrong.

In this case, the encryption algorithm decryption controller 34 outputs an error signal. As a result, a message "M" may not be encrypted with the encryption algorithm "Al".

As a matter of course, if the terminal unit 20ia correctly transmits a demand to the center unit 10a every "n" times that an encryption algorithm is used, the correct encrypted data E2(Kt+1)[Al] can be obtained and stored into the encryption algorithm memory 22. In this case, the encryption algorithm decryption controller 34 correctly decrypts the encrypted data E2(Kt+1)[Al] by using the output value "Kt+1" from the stream cipher 33 as a cipher-key, and inputs the decryption result of the encrypted data E2(Kt+1)[Al], that is an encryption algorithm "Al", into the encrypting and decrypting controller 24.

As a result, the encrypting and decrypting controller 24 may correctly encrypt a message "M" by using the encryption algorithm "Al" and the communication cipher-key "Kij", and transmit the encrypted data E(Al, Kij)[M] to the other terminal unit 20j.

According to the second embodiment of the encryption algorithm management system, the encryption algorithm controller 30 counts the number of transmission of the encrypted data E2(Kt)[Al] from the encryption algorithm memory 22. Further, the encryption algorithm controller 30 inputs the encryption algorithm "Al", that is the decryption result of the encrypted data E2(Kt)[Al], into the encrypting and decrypting controller 24 if the number of the transmission is less than "n" times, but inputs a random data, which is the decryption result in failure, into the encrypting and decrypting controller 24 if the number of the transmission is "n" times or over.

Accordingly, since encryption algorithm may be used only if a cipher-key to the ciphered encryption algorithm, that is the state value, is correctly renewed in the center unit 10a, the encryption algorithm for the data encryption system may be managed, thereby preventing the encryption algorithm from utilized carelessly or dishonestly. Further, since the encryption algorithm controller 30 is stored in unreadable memory area that may not be rewritten by user, the encryption algorithm management system may prevent dishonest use of the encryption algorithm that is executed by means of backup of the memory area of the terminal unit 20ia.

Third Embodiment

Figure 5:
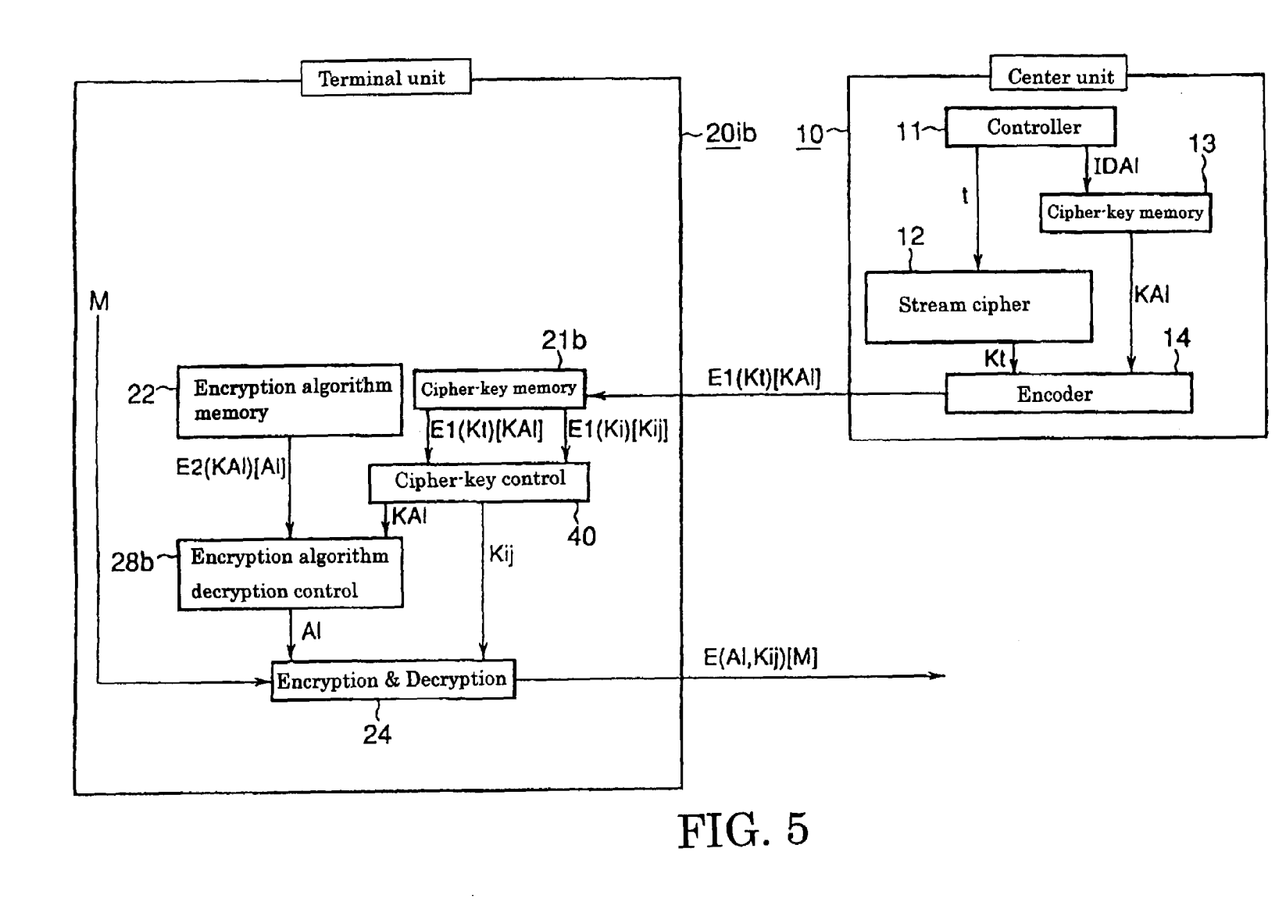
FIG. 5 is a block diagram showing an encryption algorithm management system of a third embodiment of the present invention.
Figure 6:
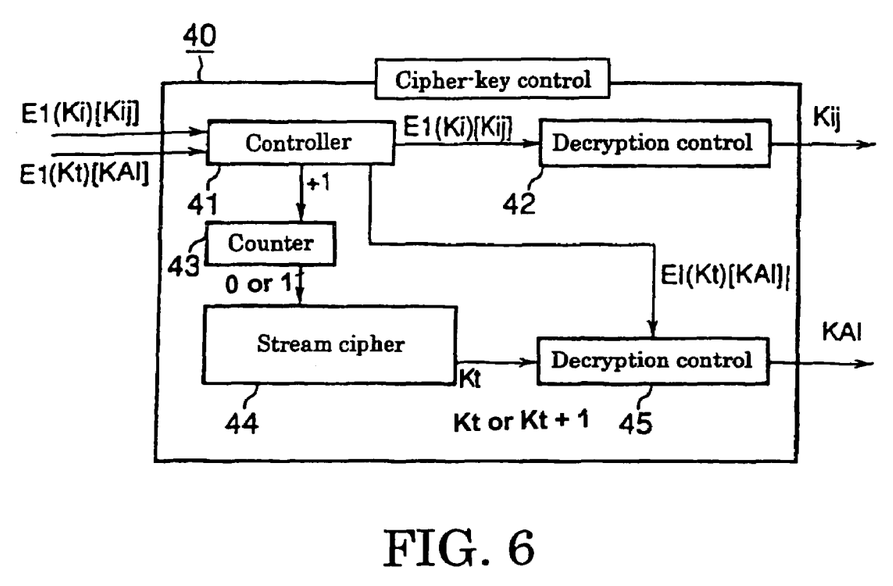
FIG. 6 is a block diagram showing components of a cipher-key information controller of the third embodiment.

FIG. 5 is a block diagram showing an encryption algorithm management system of a third embodiment of the present invention. FIG. 6 is a block diagram showing components of a cipher-key information controller 40.

The encryption algorithm management system of the third embodiment is a modified system of the first embodiment. In the third embodiment, a terminal unit transmits a demand to the center unit every "n" times that a cipher key is used, instead of transmitting the demand every time.

The terminal unit 20ib has a function of storing an encrypted data E1(Kt)[KAl] including a cipher-key "KAl", which is transmitted from the center unit 10, into the cipher-key information memory 21b. Further, as shown in FIG. 6, the terminal unit 20ib has the cipher-key information controller 40 that includes a counter 43 instead of the encryption algorithm controller 23 shown in FIG. 2.

The cipher-key information memory 21b memorizes an encrypted data E1(Ki)[Kij] for a communication cipher-key "Kij" and stores the encrypted data E1(Kt)[KAl] transmitted from the center unit 10. The terminal unit 20ib may control the cipher-key information memory 21b to transmit both the encrypted data E1(Ki)[Kij] and the encrypted data E1(Kt)[KAl].

The cipher-key information controller 40 has a function of inputting the communication cipher-key "Kij", that is the decryption result of the encrypted data E1(Ki)[Kij], into the encrypting and decrypting controller 24 in case of receiving the encrypted data E1(Ki)[Kij] and the encrypted data E1(Kt)[KAl] from the cipher-key information memory 21b. Further, the cipher-key information controller 40 has a function of counting the number of transmission of the encrypted data E1(Kt)[KAl] from the cipher-key information memory 21b. Furthermore, the cipher-key information controller 40 has functions of inputting the cipher-key "KAl", that is the decryption result of the encrypted data E1(Kt)[KAl], into the encryption algorithm decryption controller 28b if the number of the transmission is less than "n" times, but inputting a random data, which is the decryption result in failure, into the encryption algorithm decryption controller 28b if the number of the transmission is "n" times or over.

The cipher-key information controller 40, which is stored in unreadable memory area that may not be rewritten by outsiders such as users, includes a controller 41, a first cipher-key decryption controller 42, the counter 43, a stream cipher 44 and a second cipher-key decryption controller 45 as shown in FIG. 6.

The controller 41 has a function of inputting the encrypted data E1(Ki)[Kij], the encrypted data E1(Kt)[KAl] and a count signal "1" into the respective first cipher-key decryption controller 42, second cipher-key decryption controller 45 and counter 43 in case of receiving the encrypted data E1(Ki)[Kij] and the encrypted data E1(Kt)[KAl] from the cipher-key information memory 21b.

The first cipher-key decryption controller 42 has functions of decrypting the encrypted data E1(Ki)[Kij] by using a peculiar cipher-key "Ki" owned by the terminal unit 20ib, and inputting the decryption result of the encrypted data E1(Ki)[Kij], that is the communication cipher-key "Kij", into the encrypting and decrypting controller 24.

The counter 43 memorizes the number of the count signals and has a function of increasing the number of the count signals by one in case of receiving the count signal "1" from the controller 41. Further, the counter 43 has functions of inputting a signal "0" into the stream cipher 44 if the renewed number of the count signals is less than an upper limit, which corresponds to the "n" times, of a permission to use the encryption algorithm, and inputting a signal "1" into the stream cipher 44 if the renewed number of the count signals is the upper limit or over.

The stream cipher 44 stores a new state value "t+1" and has functions of inputting the value "Kt+1" corrensponding to the state value "t+1" into the second cipher-key decryption controller 45 in case of receiving the signal "1" from the counter 43, and inputting a value "Kt" that originates from the current state value "t" into the second cipher-key decryption controller 45 in case of receiving the signal "0" from the counter 43.

The second cipher-key decryption controller 45 has functions of decrypting the encrypted data E1(Kt)[KAl] by using the output value "Kt" from the stream cipher 44 as a cipher-key, and inputting the decryption result of the encrypted data E1(Kt)[KAl], that is the cipher-key "KAl", into the encryption algorithm decryption controller 28b. Further, the second cipher-key decryption controller 45 has functions of inputting the decryption result in failure into the encryption algorithm decryption controller 28b when the cipher-key is wrong.

The encryption algorithm decryption controller 28b has functions of decrypting the encrypted data E2(KAl)[Al] from the encryption algorithm memory 22 by using the decryption result "KAl" as a cipher-key, and inputting the decryption result of the encrypted data E2(KAl)[Al], that is an encryption algorithm "Al", into the encrypting and decrypting controller 24.

An operation of the above-mentioned encryption algorithm management system is hereinafter described.

The center unit 10 transmits the encrypted data E1(Kt)[KAl]including a cipher-key "KAl" to the terminal unit 20ib in case of receiving a demand for the encrypted data E1(Kt)[KAl] from the terminal unit 20ib.

The terminal unit 20ib stores the encrypted data E1(Kt)[KAl] into the cipher-key information memory 21b, and controls the cipher-key information memory 21b to transmit the encrypted data E1(Ki)[Kij] and the encrypted data E1(Kt)[KAl] to the cipher-key information controller 40 every time that an encryption algorithm is used.

In the cipher-key information controller 40, the controller 41 inputs the encrypted data E1(Ki)[Kij], the encrypted data E1(Kt)[KAl] and a count signal "1" into the respective first cipher-key decryption controller 42, second cipher-key decryption controller 45 and counter 43 in case of receiving the encrypted data E1(Ki)[Kij] and the encrypted data E1(Kt)[KAl] from the cipher-key information memory 21b.

The first cipher-key decryption controller 42 decrypts the encrypted data E1(Ki)[Kij] by using a peculiar cipher-key "Ki" owned by the terminal unit 20ib, and inputs the decryption result of the encrypted data E1(Ki)[Kij] that is the communication cipher-key "Kij", into the encrypting and decrypting controller 24.

The counter 43 memorizes the number of the count signals and increases the number of the count signals by one in case of receiving the count signal "1" from the controller 41. Further, the counter 43 inputs a signal "0" into the stream cipher 44 if the renewed number of the count signals is less than an upper limit, which corresponds to the "n" times, of a permission to use the encryption algorithm, and inputs a signal "1" into the stream cipher 44 if the renewed number of the count signals is the upper limit or over.

The stream cipher 44 inputs the value "Kt" into the second cipher-key decryption controller 45 in case of receiving the signal "0" from the counter 43, and inputs a value "Kt+1" that originates from the new state value "t+1" into the second cipher-key decryption controller 45 in case of receiving the signal "1" from the counter 43.

The second cipher-key decryption controller 45 decrypts the encrypted data E1(Kt)[KAl] by using the output value "Kt" from the stream cipher 44 as a cipher-key, and inputs the decryption result of the encrypted data E1(Kt)[KAl], that is the cipher-key "KAl", into the encryption algorithm decryption controller 28b.

The encryption algorithm decryption controller 28b decrypts the encrypted data E2(KAl)[Al] from the encryption algorithm memory 22 by using the decryption result "KAl" as a cipher-key, and inputs the decryption result of the encrypted data E2(KAl)[Al], that is an encryption algorithm "Al", into the encrypting and decrypting controller 24.

The encrypting and decrypting controller 24 encrypts a message "M", which is inputted by the terminal unit 20ib itself, by using the encryption algorithm "Al" from the encryption algorithm decryption controller 28b and the communication cipher-key "Kij" from the first cipher-key decryption controller 42, and transmits the encrypted data E(Al, Kij)[M] to the other terminal unit 20j.

Further, the encryption algorithm decryption controller 28b inputs the decryption result in failure into the encrypting and decrypting controller 24 when the cipher-key is wrong.

In this case, the encryption algorithm decryption controller 28b outputs an error signal. As a result, a message "M" may not be encrypted with the encryption algorithm "Al".

As a matter of course, if the terminal unit 20ib correctly transmits a demand to the center unit 10 every "n" times that an encryption algorithm is used, the correct encrypted data E1(Kt+1)[KAl] can be obtained and stored into the cipher-key information memory 21b. In such case, the encryption algorithm decryption controller 28b correctly decrypts the encrypted data E1(Kt+1)[KAl] by using the state value "Kt+1" from the stream cipher 44 as a cipher-key, and inputs the decryption result of the encrypted data E1(Kt+1)[KAl], that is a cipher-key "KAl", into the encrypting and decrypting controller 24.

As a result, the encrypting and decrypting controller 24 may correctly encrypt a message "M" by using the encryption algorithm "Al" and the communication cipher-key "Kij", and transmit the encrypted data E(Al, Kij)[M] to the other terminal unit 20j.

According to the third embodiment of the encryption algorithm management system, the cipher-key information controller 40 inputs the communication cipher-key "Kij", that is the decryption result of the encrypted data E1(Ki)[Kij], into the encrypting and decrypting controller 24 in case of receiving the encrypted data E1(Ki)[Kij] and the encrypted data E1(Kt)[KAl] from the cipher-key information memory 21b. Further, the cipher-key information controller 40 counts the number of transmission of the encrypted data E1(Kt)[KAl] from the cipher-key information memory 21b. Furthermore, the cipher-key information controller 40 inputs the cipher-key "KAl", that is the decryption result of the encrypted data E1(Kt)[KAl], into the encryption algorithm decryption controller 28b if the number of the transmission is less than "n" times, but inputs a random data, which is the decryption result in failure, into the encryption algorithm decryption controller 28b if the number of the transmission is "n" times or over.

Accordingly, since encryption algorithm may be used only if a cipher-key to the ciphered encryption algorithm, that is the state value, is correctly renewed in the center unit 10, the encryption algorithm for the data encryption system may be managed, thereby preventing the encryption algorithm from utilized carelessly or dishonestly. Further, since the cipher-key information controller 40 is stored in an unreadable memory area that may not be rewritten by user, the encryption algorithm management system may prevent dishonest use of the encryption algorithm that is executed by means of backup of the memory area of the terminal unit 20*ib*.

In the first embodiment, although the terminal unit 20*i* transmits a demand for the encrypted data of a cipher-key to the center unit 10 every time an encryption algorithm is used in the terminal unit 20*i*, the terminal unit 20*i* may include a counter positioned between the controller 25 and the stream cipher 26 in the same way as the second and third embodiments. In such system, the terminal unit 20*i* may count the number of use of the cipher-key every time the encrypted data of the cipher-key is used, and may forbid using an encryption algorithm if the number of use of the cipher-key exceeds "n" times. That is, the terminal unit 20*i* may use the encryption algorithm only if the terminal unit 20*i* correctly demands the encrypted data of the cipher-key from the center unit 10 every "n" times.

Likewise, in the second and third embodiments, although the terminal units 10*ia* and 10*ib* count the number of use of the encrypted data transmitted from the center units 10*a* and 10 by means of the counters 32 and 43, and forbid using an encryption algorithm if the number of use of the encrypted data exceeds "n" times, the terminal units 10*ia* and 10*ib* may dispense with the counters 32 and 43, and may demand the encrypted data from the center unit 10 every time the encrypted data is used in the same way as the first embodiment. According to such system, the similar effect may be achieved.

In every embodiment, although each of the stream ciphers 12 of the center units 10 and 10*a* receives a state value "t" and then outputs the value "Kt" correnponding to the state value "t", the stream cipher 12 may be substituted to a key generator that may produce the output value "Kt" on the basis of the state value "t" in a predetermined procedure, for example, a random number generator that may generate a random number in a predetermined sequence. Likewise, the key generator may be substituted for the stream ciphers 26, 33 and 44 of the terminal units 10*i*, 10*ia* and 10*ib*. According to the above-mentioned system, the similar effect may be achieved.

The operation of the encryption algorithm management system described in every embodiment may be stored in a medium as a program that can be executed by computer so as to be delivered easily. The medium is, for example, a magnetic disc, a floppy disc, a hard disc, a laser disc such as CD-ROM, CD-R, DVD or the like, a laser magnetic disc such as MO or the like, a semiconductor memory or the like. The medium is not limited to the above-mentioned examples provided that the medium is a computer-readable medium that may store a computer program.

An OS (Operating System) that operates on the basis of instructions of a program installed from the medium, or an MW (Middle-ware) such as a database managing software, a network software or the like, may execute a part of the operation of the encryption algorithm management system described in every embodiment.

Further, the medium is not limited to a separated medium from computer. That is, the medium also means a medium that downloads or temporarily downloads a program transmitted through a LAN, the Internet or the like.

Furthermore, the medium is not limited to a single medium. That is, the medium may consist of a plurality of medium that executes the entire operation of the encryption algorithm management system.

The computer may consist of a single computer such as a personal computer or the like, or a computer system having a plurality of computer connected to each other through a network.

Further, the computer is not limited to a personal computer. The computer means a device or an apparatus, for example a processor of an information processing system or a microprocessor, which are capable of operating functions of the encryption algorithm management system by means of computer program.

According to the present invention, it is realized to provide an encryption algorithm management system that may prevent encryption algorithm from utilized carelessly or dishonestly by supervising the encryption algorithm used for a data encryption system.

Various modifications and variations are possible in light of the above teachings. Therefore, it is to be understood that within the scope of the appended claims, the present invention may be practiced otherwise than as specifically described herein.

What is claimed is:

1. An encryption algorithm management system, comprising:
   a terminal unit; and
   a center unit,
   the terminal unit and the center unit having a common cipher-key,
   said terminal unit comprising:
      a transmitter configured to transmit a demand to said center unit for obtaining an encrypted data needed for decrypting a ciphered encryption algorithm,
      an encryption controller configured to renew said common cipher-key in every case of receiving said encrypted data from said center unit in response to said demand, decrypt a cipher-key for the ciphered encryption algorithm from the encrypted data with the renewed common cipher-key, and decrypt an encryption algorithm from the ciphered encryption algorithm with the cipher-key for the ciphered encryption algorithm, and
      an encryption unit configured to encrypt a message with the encryption algorithm and send the encrypted message to a second terminal;
   said center unit comprising:
      a key controller configured to renew said common cipher-key so as to be identical with said renewed common cipher-key in case of receiving said demand from said transmitter, and
      an encoder configured to produce said encrypted data by encrypting the cipher-key for the ciphered encryption algorithm with said renewed common cipher-key and transmit said encrypted data to said terminal unit.

2. A terminal unit having a common cipher-key in common with a common cipher-key in a center unit, said terminal unit comprising:
   a transmitter configured to transmit a demand to said center unit for obtaining an encrypted data needed for decrypting a ciphered encryption algorithm,
   an encryption controller configured to renew said common cipher-key in every case of receiving said encrypted data from said center unit in response to said demand, decrypt a cipher-key for the ciphered encryption algorithm from the encrypted data with the renewed common cipher-key, and decrypt an encryption algorithm from the ciphered encryption algorithm with the cipher-key for the ciphered encryption algorithm; and an encryption unit configured to encrypt a message with the encryption algorithm and send the encrypted message to a second terminal.

3. The terminal unit as recited in claim 2, wherein said encryption controller is stored in a memory area that may not be read or rewritten by outsiders.

4. The system of claim 1, wherein said terminal unit further comprises an encryption algorithm memory configured to store said ciphered encryption algorithm.

5. The system of claim 1, wherein said transmitter is further configured to transmit a demand when the encryption algorithm is decrypted.

6. The system of claim 1, wherein said transmitter is further configured to transmit a demand every predetermined number of times that the encryption algorithm is decrypted.

7. The system of claim 1, wherein said encryption controller is stored in a memory area that may not be read or rewritten by outsiders.

8. The system of claim 1, wherein said center unit further comprises a verification controller configured to determine if said terminal unit is authorized to use said encryption algorithm at the time of receiving said demand from said terminal unit, and to have said key controller renew said common cipher-key only if said terminal unit is determined to be authorized.

9. The terminal unit of claim 2, further comprising an encryption algorithm memory configured to store said ciphered encryption algorithm.

10. The terminal unit of claim 2, further comprising an encryption unit configured to encrypt a message with the encryption algorithm and send the encrypted message to a second terminal.

11. The terminal unit of claim 2, wherein said transmitter is further configured to transmit a demand when the encryption algorithm is decrypted.

12. The terminal unit of claim 2, wherein said transmitter is further configured to transmit a demand every predetermined number of times that the encryption algorithm is decrypted.

13. An encryption algorithm management system, comprising:
a terminal unit; and
a center unit,
the terminal unit and the center unit having a common cipher-key,
said terminal unit comprising:
a transmitter configured to transmit a demand to said center unit for obtaining a ciphered encryption algorithm,
an encryption controller configured to renew said common cipher-key in every case of receiving said ciphered encryption algorithm from said center unit in response to said demand, and decrypt an encryption algorithm from the ciphered encryption algorithm with the renewed common cipher-key, and
an encryption unit configured to encrypt a message with the encryption algorithm and send the encrypted message to a second terminal;

said center unit comprising:
a key controller configured to renew said common cipher-key so as to be identical with said renewed common cipher-key in case of receiving said demand from said transmitter, and
an encoder configured to produce said ciphered encryption algorithm with said renewed common cipher-key and transmit said ciphered encrypted algorithm to said terminal unit.

14. The system of claim 13, wherein said terminal unit further comprises an encryption algorithm memory configured to store said ciphered encryption algorithm.

15. The system of claim 13, wherein said transmitter is further configured to transmit a demand when the encryption algorithm is decrypted.

16. The system of claim 13, wherein said transmitter is further configured to transmit a demand every predetermined number of times that the encryption algorithm is decrypted.

17. The system of claim 13, wherein said encryption controller is stored in a memory area that may not be read or rewritten by outsiders.

18. The system of claim 13, wherein said center unit further comprises a verification controller configured to determine if said terminal unit is authorized to use said encryption algorithm at the time of receiving said demand from said terminal unit, and to have said key controller renew said common cipher-key only if said terminal unit is determined to be authorized.

19. A terminal unit having a common cipher-key in common with a common cipher-key in a center unit, said terminal unit comprising:
a transmitter configured to transmit a demand to said center unit for obtaining a ciphered encryption algorithm,
an encryption controller configured to renew said common cipher-key in every case of receiving said ciphered encryption algorithm from said center unit in response to said demand, and decrypt an encryption algorithm from the ciphered encryption algorithm with the renewed common cipher-key, and
an encryption unit configured to encrypt a message with the encryption algorithm and send the encrypted message to a second terminal.

20. The terminal unit of claim 19, further comprising an encryption algorithm memory configured to store said ciphered encryption algorithm.

21. The terminal unit of claim 19, wherein said transmitter is further configured to transmit a demand when the encryption algorithm is decrypted.

22. The terminal unit of claim 19, wherein said transmitter is further configured to transmit a demand every predetermined number of times that the encryption algorithm is decrypted.

23. The terminal unit of claim 19, wherein said encryption controller is stored in a memory area that may not be read or rewritten by outsiders.

24. An encryption algorithm management system having a terminal unit and a center unit that have a common cipher-key to a ciphered encryption algorithm,
said terminal unit comprises:
a transmitter configured to transmit a demand to said center unit for obtaining an encrypted data needed for decrypting said ciphered encryption algorithm when said ciphered encryption algorithm is decrypted;

an encryption controller configured to renew said common cipher-key in every case of receiving said encrypted data from said center unit in response to said demand, and to produce an encryption algorithm by decrypting said encrypted data with the renewed common cipher-key, wherein said encryption controller has a counter for counting a number transmitted from a controller, and if said counter receives a number transmitted from said controller more than a prescribed number of times, said encryption controller does not produce an encryption algorithm by decrypting said encrypted data with said renewed common cipher-key, and an encryption unit configured to encrypt a message with the encryption algorithm and send the encrypted message to a second terminal;

said center unit comprises:

a key controller configured to renew said common cipher-key so as to be identical with said renewed common cipher-key in case of receiving said demand from said transmitter; and an encoder configured to produce said encrypted data by encrypting a cipher-key with said renewed common cipher-key and to transmit said encrypted data to said terminal unit.

* * * * *